(12) United States Patent
Smith et al.

(10) Patent No.: US 6,666,968 B2
(45) Date of Patent: Dec. 23, 2003

(54) FLUID FILTRATION APPARATUS

(75) Inventors: Gerald F. Smith, Watertown, MN (US);
Loran W. Sutton, East Peoria, IL (US);
Gary F. Krofchalk, Rockwall, TX (US)

(73) Assignee: Vortex International, LLC, Peoria, IL (US)

(*) Notice: Subject to any disclaimer, the term of this patent is extended or adjusted under 35 U.S.C. 154(b) by 0 days.

(21) Appl. No.: 09/815,938

(22) Filed: Mar. 22, 2001

(65) Prior Publication Data

US 2002/0134725 A1 Sep. 26, 2002

(51) Int. Cl.$^7$ .................. B01D 27/10; B01D 27/14; B01D 29/58
(52) U.S. Cl. ............. 210/254; 210/256; 210/301; 210/304; 210/309; 210/315; 210/316; 210/323.2; 210/338; 210/433.1; 210/440; 210/444; 210/457; 210/489; 210/497.01; 210/499; 210/DIG. 13; 210/DIG. 17
(58) Field of Search .................... 210/435, 437, 210/440, 457, 458–459, 499, 323.2, 335, 337–338, 314–315, 443, 322–323.1, 316, 252, 254, DIG. 13, DIG. 17, 497.1; 55/482–483, 485, 321–323, 350.1

(56) References Cited

U.S. PATENT DOCUMENTS

| 601,392 | A | 3/1898 | Bowden |
| 1,149,926 | A | 8/1915 | Linke |
| 1,822,006 | A | 9/1931 | Bull |
| 1,892,190 | A | 12/1932 | Russel |
| 1,908,925 | A | 5/1933 | Semon et al. |
| 1,976,914 | A | 10/1934 | Benjamin |
| 2,083,005 | A | 8/1937 | Czarnecki |

(List continued on next page.)

FOREIGN PATENT DOCUMENTS

| DE | 288983 | A5 | 4/1991 |
| DE | 3933794 | A1 | 4/1991 |
| DE | 4022723 | A1 | 4/1991 |
| EP | 0025628 | A2 | 3/1981 |
| FR | 2475118 | | 8/1981 |
| GB | 1203514 | | 8/1970 |
| GB | 1296051 | | 11/1972 |
| GB | 2068765 | | 8/1981 |
| GB | 2258166 | | 2/1993 |
| SU | 1101273 | A | 6/1982 |
| US | 1118368 | A2 * | 7/2001 |
| WO | WO 95/11072 | | 4/1995 |
| WO | WO 97/01385 | | 1/1997 |

OTHER PUBLICATIONS

NAPA Gold; Master Filter Catalog; Jan., 1999.

*Primary Examiner*—W. L. Walker
*Assistant Examiner*—Marianne Ocampo
(74) *Attorney, Agent, or Firm*—Gerald E. Helget; Nelson R. Capes; Briggs and Morgan

(57) ABSTRACT

An oil filter assembly has an outer canister in which full flow and bypass flow filtration sections are operatively housed in a nested relationship. Oil forced into the canister has imparted thereto a vortex flow pattern which forces contaminant particles in the oil away from the full flow filter section before the oil passes therethrough. The bypass filtration section is disposed within the full flow filtration section and creates a second vortex flow pattern in the oil which induces a small portion thereof to flow through a bypass filter element while at the same time causing the entire balance of the oil to bypass this filter element and be discharged from the canister after having traversed the filtering portion of only the full flow filtration portion of the filter assembly.

29 Claims, 3 Drawing Sheets

U.S. PATENT DOCUMENTS

| | | |
|---|---|---|
| 2,284,787 A | 6/1942 | Winkler |
| 2,382,278 A | 8/1945 | Widmann |
| 2,390,841 A | 12/1945 | Longden |
| 2,423,329 A | 7/1947 | LeClair |
| 2,743,018 A | 4/1956 | Belgarde |
| 2,879,892 A | 3/1959 | Frakes |
| 2,933,192 A | 4/1960 | Gretzinger |
| 2,937,754 A | 5/1960 | Kasten |
| 2,983,384 A | 5/1961 | Winslow |
| 3,000,505 A | 9/1961 | Scavuzzo |
| 3,008,543 A | 11/1961 | Bourdale et al. |
| 3,036,711 A | 5/1962 | Wilhelm |
| 3,061,101 A | 10/1962 | Humbert, Jr. |
| 3,095,283 A | 6/1963 | Wheeler, Jr. |
| 3,122,501 A | 2/1964 | Hultgren |
| 3,193,101 A | 7/1965 | Humbert, Jr. |
| 3,224,590 A | 12/1965 | Nord et al. |
| 3,225,929 A | 12/1965 | Sicard |
| 3,282,429 A | 11/1966 | Wood et al. |
| 3,283,902 A | 11/1966 | Farris et al. |
| 3,289,608 A | 12/1966 | Laval et al. |
| 3,289,847 A | 12/1966 | Rothemund |
| 3,348,695 A | 10/1967 | Rosaen |
| 3,400,821 A | 9/1968 | Singleton |
| 3,443,696 A | 5/1969 | Schutte |
| 3,473,666 A | 10/1969 | Humbert, Jr. |
| 3,490,597 A | 1/1970 | Casaleggi |
| 3,502,218 A | 3/1970 | Tuffnell et al. |
| 3,508,383 A | 4/1970 | Humbert, Jr. et al. |
| 3,690,460 A | 9/1972 | Lindboe |
| 3,722,691 A | 3/1973 | Francois |
| 3,741,394 A | 6/1973 | Defenbaugh |
| 3,773,180 A | 11/1973 | Harrison |
| 3,785,491 A | 1/1974 | Dudinec et al. |
| 3,807,561 A | 4/1974 | Cullis |
| 3,882,025 A | 5/1975 | Talley, Jr. |
| 3,988,244 A | 10/1976 | Brooks |
| 4,045,349 A | 8/1977 | Humbert, Jr. |
| 4,108,778 A | 8/1978 | Lambert et al. |
| 4,132,641 A | 1/1979 | Elsworth |
| 4,349,438 A | 9/1982 | Sims |
| 4,465,595 A | 8/1984 | Cooper |
| 4,492,632 A | 1/1985 | Mattson |
| 4,622,136 A | 11/1986 | Karcey |
| 4,642,183 A | 2/1987 | Hebert |
| 4,690,759 A | 9/1987 | Mandy |
| 4,695,377 A | 9/1987 | Medley, III |
| 4,700,670 A | 10/1987 | Schade |
| 4,717,474 A | 1/1988 | Sims |
| 4,767,530 A | 8/1988 | Gilliam et al. |
| 4,783,271 A * | 11/1988 | Silverwater ................. 210/149 |
| 4,992,166 A | 2/1991 | Lowsky et al. |
| 5,015,375 A | 5/1991 | Fleck |
| 5,047,148 A | 9/1991 | Arai |
| 5,051,173 A | 9/1991 | Hoelzl |
| 5,053,129 A | 10/1991 | Kitson |
| 5,066,180 A | 11/1991 | Lang et al. |
| 5,066,391 A | 11/1991 | Faria |
| 5,076,918 A | 12/1991 | Foust et al. |
| 5,078,877 A * | 1/1992 | Cudaback et al. .......... 210/315 |
| 5,080,787 A | 1/1992 | Brown et al. |
| 5,082,561 A | 1/1992 | La Pierre |
| 5,084,162 A | 1/1992 | Conti |
| 5,089,129 A | 2/1992 | Brigman |
| 5,118,417 A | 6/1992 | Deibel |
| 5,152,890 A * | 10/1992 | Linnersten ................. 210/315 |
| 5,171,430 A | 12/1992 | Beach et al. |
| 5,182,015 A | 1/1993 | Lee |
| 5,234,592 A | 8/1993 | Schneider |
| 5,284,579 A | 2/1994 | Covington |
| 5,291,969 A | 3/1994 | Diederich, Jr. |
| 5,342,511 A * | 8/1994 | Brown et al. ................ 210/137 |
| 5,342,519 A | 8/1994 | Friedmann et al. |
| 5,376,268 A | 12/1994 | Ikeda |
| 5,387,340 A | 2/1995 | Ackerman |
| 5,432,519 A | 7/1995 | Sezai |
| 5,542,442 A | 8/1996 | Gorman, Sr. |
| 5,565,095 A | 10/1996 | Snowball |
| 5,569,373 A * | 10/1996 | Smith et al. ................. 210/130 |
| 5,623,755 A | 4/1997 | Childress et al. |
| 5,674,393 A * | 10/1997 | Terhune et al. ............. 210/315 |
| 5,753,117 A * | 5/1998 | Jiang ......................... 210/232 |
| 5,785,850 A | 7/1998 | Lynch et al. |
| 5,830,371 A | 11/1998 | Smith et al. |
| 5,922,199 A * | 7/1999 | Hodgkins ................... 210/130 |
| 5,984,109 A * | 11/1999 | Kanwar et al. ............. 210/440 |
| 6,068,762 A * | 5/2000 | Stone et al. ................. 210/90 |
| 6,152,120 A | 11/2000 | Julazadeh |
| 6,355,169 B1 | 3/2002 | Smith |
| 6,409,919 B1 * | 6/2002 | Tara ........................... 210/232 |
| 6,478,958 B1 * | 11/2002 | Beard et al. ............. 210/323.2 |
| 6,488,848 B1 | 12/2002 | Smith |

* cited by examiner

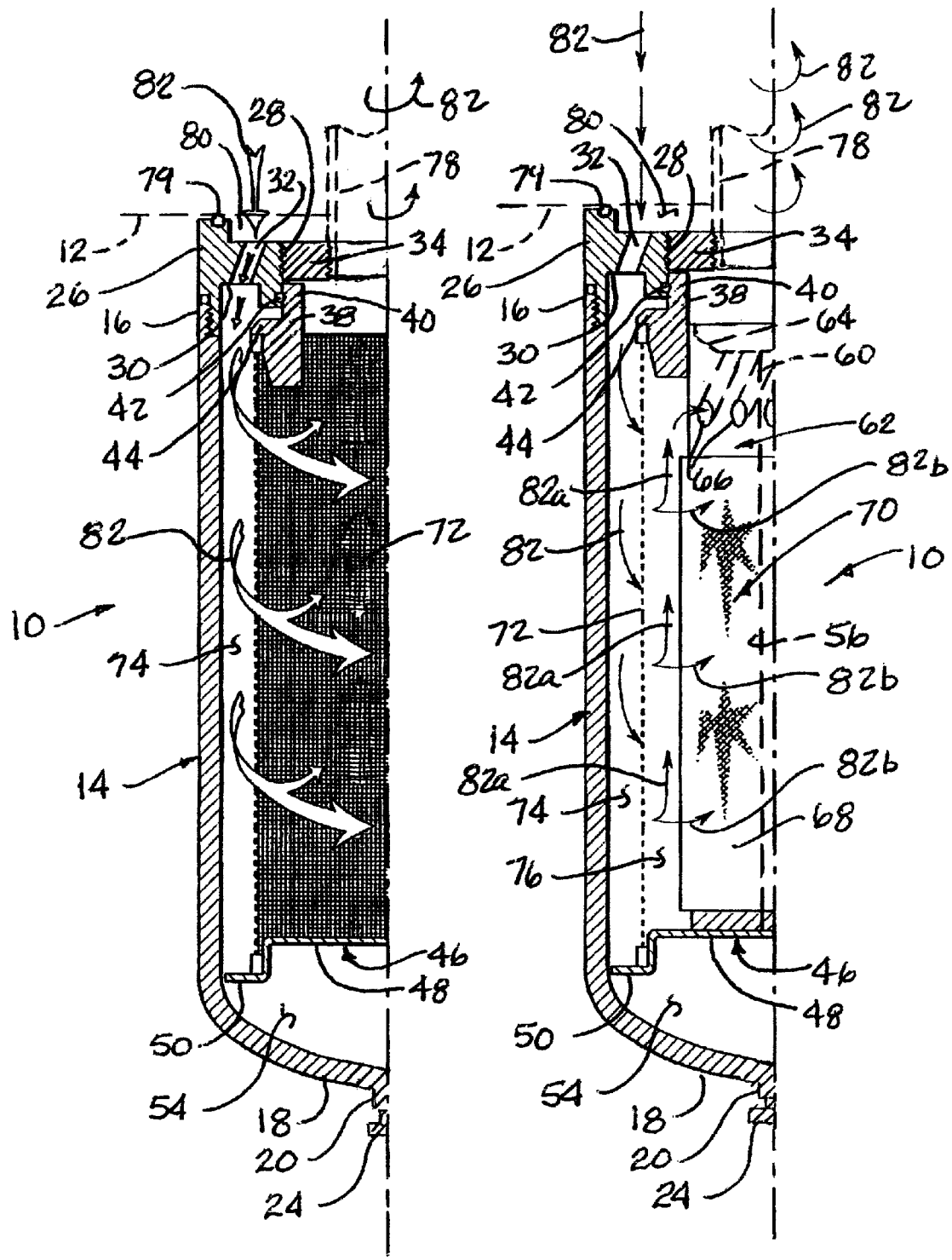

FLUID FILTRATION APPARATUS

BACKGROUND OF THE INVENTION

The present invention generally relates to fluid filtration apparatus and, in a preferred embodiment thereof, more particularly relates to an oil filter assembly having uniquely integrated full flow and bypass flow portions.

In its broadest sense, a fluid is a substance (such as a liquid or a gas) capable of flowing within a defined system and/or conforming to the outline of a container in which it is stored. A system or other device within which one or more fluids flows along an expected fluid flow path may include a fluid filter. Within the system or device, the fluid filter is oftentimes positioned along the expected fluid flow path such that the fluid will flow through the filter. For example, fluid filters are used in various automotive vehicle engine applications to remove contaminants from fluids flowing within the engine, for example, the engine oil currently used to lubricate bearings and reduce friction in automotive vehicle engines. Of course, it should be clearly understood that there are a wide variety of other applications other than those specific applications set forth herein which may benefit from incorporation of one or more fluid filters along a fluid flow path thereof. Accordingly, it is contemplated that such applications may include (but are not necessarily limited to) vehicle engine applications other than those specifically recited herein, non-engine vehicle applications, for example, fuel delivery systems, and non vehicle engine applications, for example, turbine engine applications, as well as any other applications not specifically recited herein but characterized by a fluid flow within a defined area.

In the aforementioned automotive vehicle engine application, lubricating oil is circulated through the engine and carries contaminants such as metal particles, carbon particles and dirt which may cause harm to the engine. In order to effectively lubricate the engine, engine oil is passed through a filter to remove the contaminants before the oil is recirculated into the engine. The typical oil filter is attached to an internal combustion engine at an oil filter receptacle portion thereof. Engine oil passes through a discharge opening in the oil filter receptacle, into a fluid filter, and then into the engine lubrication system through an oil inlet pipe. A filter element in the fluid filter removes contaminants from the oil before it reenters the engine through the oil inlet pipe. Oil filters for gasoline and diesel engines have traditionally been of the "full flow" type in which engine-generated oil pressure is utilized to flow all of the oil discharged from the engine through a filtration element in the overall filter structure before returning the oil to the engine. While this full flow type of oil filter structure is widely used, and generally suited for its intended purpose, it is subject to a variety of well known problems, limitations and disadvantages. For example, this type of full flow filtration structure is normally suited for removal of relatively large size particulate matter—namely, particles of a 40 micron size and larger. Smaller contaminants, such as soot particles generated by diesel engines, simply pass through the filter element and are permitted to be returned to the engine. Another disadvantage of conventional full flow oil filters is that since all of the oil discharged from the engine is flowed through the filtration element, such element has a relatively limited duty cycle before it becomes clogged and must be replaced (if the filtration element is of a disposable type) or cleaned (if the filtration element is of a cleanable, reuseable type).

The useful life of a full flow filter assembly may be extended by increasing the effective area of its filtration element, such as by providing the element with a pleated configuration. However, this adds considerably to the cost of the element, makes it a great deal thicker, and substantially increases the difficulty in cleaning the element if it is of the reuseable type.

Another approach to extending the duty cycle of a full flow type filter assembly is illustrated and described in U.S. Pat. No. 5,569,373 to Smith et al. which is hereby incorporated by reference herein as if reproduced in its entirety. In the illustrated full flow type filter assembly therein, oil forced from the engine into an outer tubular canister portion of the filter assembly is directed through axially and circumferentially angled inlet openings disposed radially outwardly of a tubular full flow filtration element coaxially disposed within the canister. The angulated orientation of these inlet openings causes the oil discharged into the canister to swirl in a vortex pattern outwardly around the filtration element, with the result that particulate matter is forced outwardly away from the outer side surface of the filtration element.

Due to this vortex-created centrifuge action imparted to the incoming particulate-bearing oil, partially purified oil is forced through the filtration element and then returned via the interior of the element to the engine. Particulate matter forced outwardly toward the inner side surface of the canister, and thus prevented from flowing inwardly through the full flow filter element, falls by gravity into a lower contaminant chamber of the filter assembly.

While the duty cycle of the vortex-based full flow oil filter assembly illustrated and described in U.S. Pat. No. 5,569,373 is substantially increased compared to full flow oil filter assemblies of more traditional constructions, the filter assembly is still relatively ineffective in filtering out sub-40 micron size particles such as soot particles created in abundance by diesel engines. These small contaminant particles, for the most part, simply pass through the filter element and are returned to the engine.

One conventional method of solving this problem of being unable to effectively filter out small (i.e., sub-40 micron size) contaminant particles with a full flow filter is to augment the full flow filter with a filtration structure commonly referred to as a bypass filter structure. This bypass filter structure has a filtration element sized to trap the small contaminant particles that the full flow filtration assembly cannot separate from the oil, and is connected in parallel with the full flow assembly. The bypass filter structure is mounted remote from the full flow filtration structure and is connected thereto by appropriate hoses. Oil discharged from the engine during operation thereof is routed separately to the full flow and bypass flow filtration structures, with only a small portion of the discharged oil (i.e., less than ten percent in most cases) being flowed through the bypass filtration structure. In this manner, large and small contaminant particulates are separately handled.

As conventionally practiced, this dual filtration structure approach has a variety of problems, limitations and disadvantages. For example, it substantially adds to the cost and complexity of the overall filtration system and makes it more difficult and time consuming to maintain. Additionally, the necessity of using hoses connected to the filtration apparatus substantially increases the possibility that leaks will develop in the system due to, for example, vibration stresses being imposed for long periods on the hoses and their fittings. Furthermore, since two separate filtration systems must be employed under this scheme, more space must be dedicated to the filtration system.

From the foregoing it can readily be seen that a need exists for fluid filtration apparatus that provides the benefits of both full flow and bypass flow types of filtration structures while at the same time eliminating or at least substantially reducing the above-mentioned problems, limitations and disadvantages commonly associated with auxiliary bypass flow filtration structures. It is to this need that the present invention is primarily directed.

SUMMARY OF THE INVENTION

In carrying out principles of the present invention, in accordance with a preferred embodiment thereof, a specially designed fluid filtration apparatus, representatively an oil filter assembly, is provided. From a broad perspective, the fluid filtration apparatus comprises a housing structure having an internal flow path through which a fluid to be filtered may be flowed; and full flow and bypass filtration structures operably interposed in the internal flow path, with the full flow and bypass filtration structures being disposed in series within the internal flow path, preferably with the full flow filtration structure being disposed upstream of the bypass filtration structure. Representatively, the full flow and bypass filtration structures respectively have generally tubular and cylindrical configurations, with the bypass filtration structure being coaxially nested within the full flow filtration structure.

In a preferred embodiment of the fluid filtration apparatus, the housing structure has a generally tubular configuration, a fluid inlet area and a fluid outlet area. The full flow filtration structure is defined by a generally tubular full flow fluid filter element coaxially and removably supported within the housing structure and defining with an interior surface portion thereof an annular outer flow area communicated with the fluid inlet area. The generally cylindrical bypass fluid filtration structure is coaxially supported within the full flow fluid filter element and defines therewith an inner annular flow area, the bypass fluid filtration structure having an outlet portion communicated with the fluid outlet area of the housing structure.

The fluid filtration apparatus is operative in response to forced flow of a pressurized fluid to be filtered inwardly through the fluid inlet area of the housing structure to flow the fluid sequentially through the annular outer flow area, through the full flow filter element, through the inner annular flow area, through the bypass fluid filtration structure, outwardly through the outlet portion of the bypass fluid filtration structure, and outwardly through the fluid outlet area of the housing structure.

Preferably, the fluid inlet area of the housing structure is configured in a manner such that pressurized fluid forced inwardly therethrough traverses the outer annular flow area in a whirling flow pattern centered about the full flow fluid filter element.

According to a feature of the invention, the bypass fluid filtration structure preferably includes a generally tubular bypass portion in which the outlet portion is formed, and a generally tubular filtering portion communicating with the outlet portion. The outlet portion, in response to forced fluid flow therethrough, is operative to create a lowered pressure area serving to draw fluid through the filtering portion and into the bypass portion for discharge therefrom through the fluid outlet area of the housing structure. Preferably, the outlet portion is operative to impart to fluid being discharged therefrom a swirling flow pattern.

In a preferred embodiment thereof, the bypass portion has a side wall surface portion and an outlet end surface. The outlet portion includes a circumferentially spaced series of discharge passages extending inwardly through the side wall surface portion, opening outwardly through the outlet end surface and being axially and circumferentially angled relative to the axis of the bypass portion. The generally tubular filtering portion preferably includes a perforated flow tube member having a first longitudinal portion removably and coaxially received in the bypass portion, and a second longitudinal portion, and a tubular bypass fluid filter element removably and coaxially telescoped onto the second longitudinal portion of the perforated flow tube. In further aspects of this embodiment, the tubular bypass fluid filter element is preferably a cleanable and reuseable filter element or, alternately, a disposable filter element. Similarly, in further aspects of this embodiment, the full flow fluid filter element is preferably a cleanable and reuseable filter element or, alternately, a disposable filter element.

While the fluid filtration apparatus is representatively embodied in an oil filter assembly, the principles of the present invention are in no manner limited to this particular filtration structure, and can alternatively be utilized to advantage in a variety of other filtration applications in which a variety of other types of fluids, including, but not necessarily limited to, liquids and gases, are to be filtered.

BRIEF DESCRIPTION OF THE DRAWINGS

FIG. 2 is a horizontally directed cross-sectional view, partly in elevation, through a portion of the oil filter assembly;

FIG. 3 is a simplified, horizontally directed cross-sectional view through a portion of the oil filter assembly, with a full flow filtration screen section thereof being shown in phantom for purposes of illustrative clarity.

DETAILED DESCRIPTION

Figure 1:
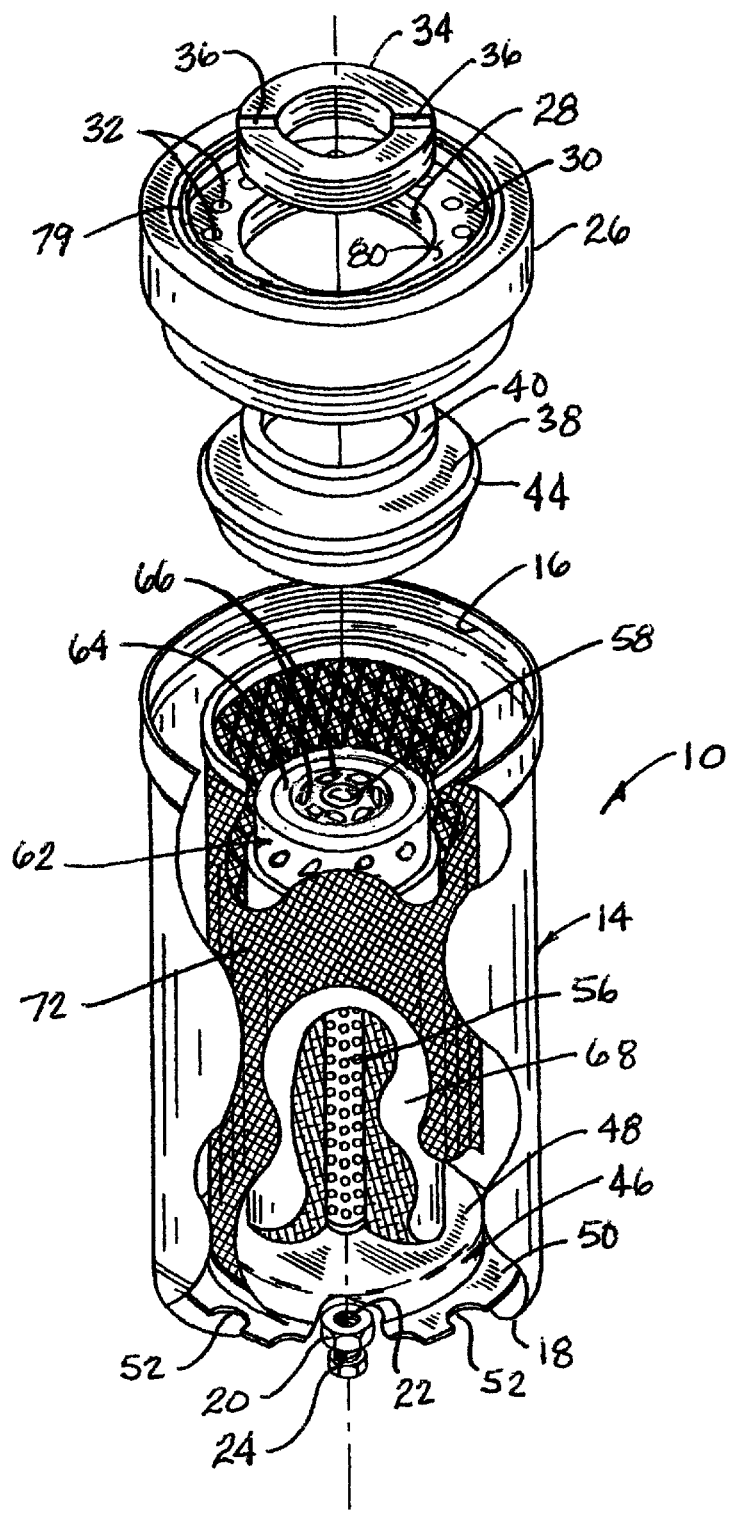
FIG. 1 is a partially cut away and exploded perspective view of a specially designed oil filter assembly embodying principles of the present invention.

Referring initially to FIGS. 1–3, the present invention provides a specially designed oil filter assembly 10 which is operatively connectable, in a subsequently described manner, to an engine block 12 of a gasoline or diesel engine. While the filter assembly will be representatively described herein in this particular application, it will be readily appreciated by those of ordinary skill in the filtration art that the assembly is also useable in a wide variety of other applications, such as in transmissions or hydraulic systems, and with a wide variety of other contaminant-bearing fluids to be filtered.

The oil filter assembly 10 includes a hollow cylindrical outer canister or housing 14 having an open, internally threaded upper end 16, and a closed lower end 18 from which an integral, generally nut-shaped drain projection 20 centrally depends. The internally threaded opening 22 of the projection 20 defines a bottom drain opening of the canister 14. A generally bolt-shaped drain plug 24 is removably threaded into the opening 22 to close it.

An annular adapter head member 26 is threaded into the open upper end 16 of the canister 14 and has a central, internally threaded circular opening 28 extending axially therethrough. Opening 28 is circumscribed by an annular, inwardly projecting flange 30 through which a circumferentially spaced series of angled inlet openings 32 extend. The inlet openings 32 are sloped axially and circumferentially relative to the axis of the adapter head 26 in a manner such that, as subsequently described herein, when oil is forced downwardly through the inlet openings 32 it swirls in a vortex flow pattern about the longitudinal axis of the canister 14.

An internally and externally threaded adapter ring 34 is threaded into the adapter head member opening 28 and has diametrically opposite, radially extending driving slots 36 formed in its top side surface to facilitate this connection. Directly below the adapter head 26 is an annular top screen fixture 38 having an annular top side flange 40 that is telescopingly received in the adapter head 26 and sealed therein by means of a suitable O-ring seal member 42 (see FIG. 2). Top screen fixture 38, which could alternatively be formed integrally with the adapter head 26 if desired, projects downwardly through the upper end 16 of the canister 14 and has an axially intermediate annular exterior peripheral flange 44.

Removably received in a bottom interior end portion of the canister 14 is a circular bottom screen fixture 46 having a raised central circular portion 48, and a bottom side annular peripheral flange 50 having a circumferentially spaced series of radially inwardly extending peripheral notches 52 formed therein. The engagement of the outer periphery of the flange 50 with a downwardly and radially sloping lower end portion of the canister side wall supports the bottom screen fixture 46 above the drain opening 22, with the bottom screen fixture 46 forming a top side wall of a contaminant chamber 54 in a lower interior end portion of the canister 14.

Longitudinally extending upwardly from a central top side portion of the raised central portion 48 of the bottom screen fixture 46, and suitably anchored thereto or formed integrally therewith, is a perforated flow tube 56 having an open upper end 58. An upper end portion of the tube 56 is slidably and removably received in the central opening 60 of a tubular bypass head member 62 (see FIG. 4 also) which, in turn, is removably received within the annular top screen fixture 38 as best illustrated in FIG. 3. Alternatively, the bypass head member 62 may be formed integrally with the overlying top screen fixture 38 if desired.

Figure 4:
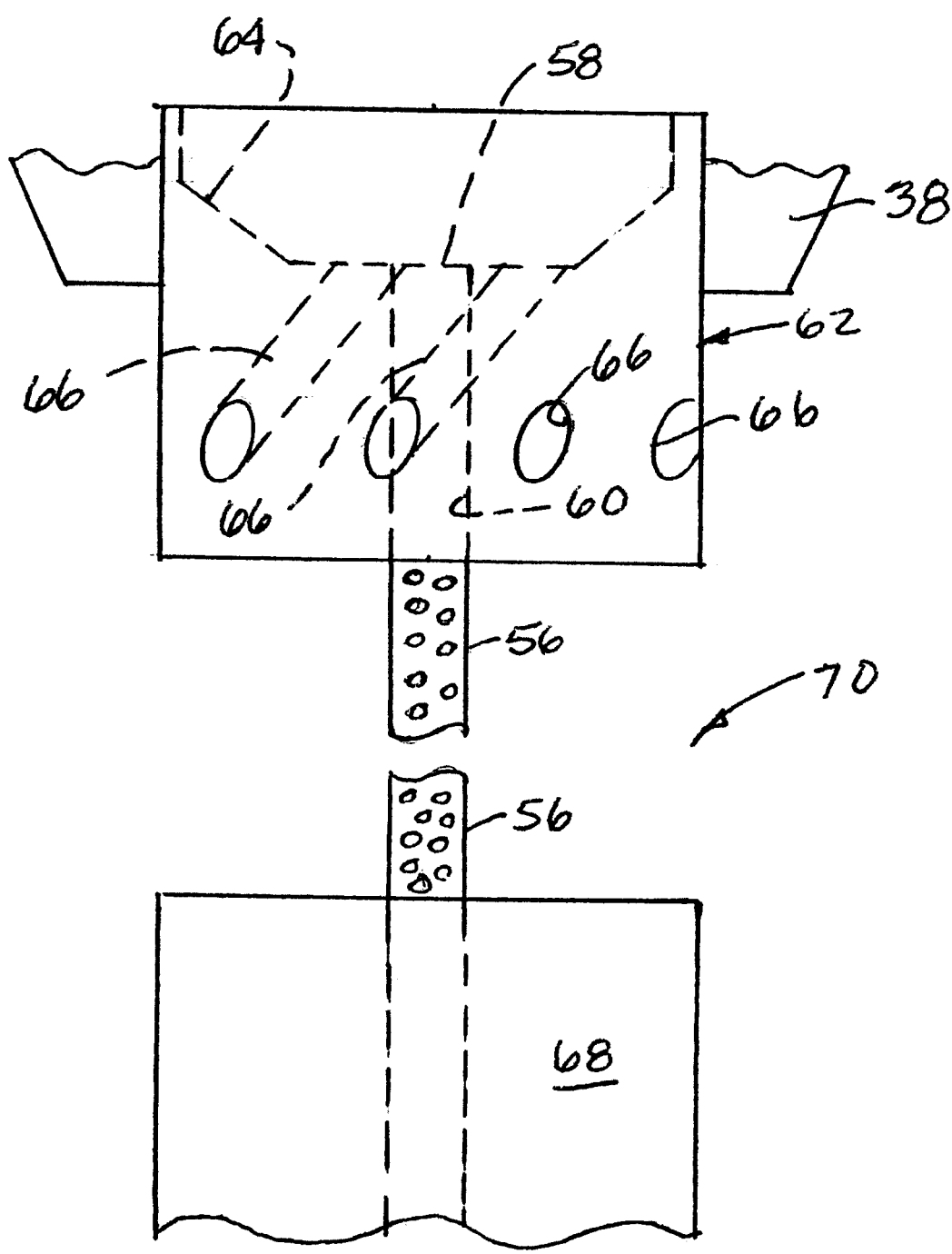
FIG. 4 is a simplified, somewhat schematic enlarged scale side elevational view of a specially designed bypass filtration portion of the overall oil filter assembly, the bypass filtration portion being longitudinally foreshortened.

With reference now to FIGS. 1, 3 and 4, the upper end of the bypass head member 62 has a sloping, axially inset central portion 64 which, at its bottom side, meets the central opening 60 of the bypass head member 62 that removably receives an upper end portion of the perforated tube 56. Extending between a vertical side wall portion of the bypass head member 62 and the sloping inset central portion 64 are a circumferentially spaced series of angled discharge openings 66 which, relative to the axis of the tubular bypass head member 62, are axially and circumferentially sloped in a manner such that, as subsequently described herein, oil discharged from the bypass head member 62 swirls in a vortex pattern about the axis of the bypass head member 62. Alternatively, the discharge openings 66 may extend axially through the bypass head member 62 so that no appreciable swirl is imparted to oil exiting the discharge openings 66.

Circumscribing the perforated flow tube 56, and axially extending between the top side of the raised central portion 48 of the bottom screen fixture 46 and the lower end of the tubular bypass head member 62 is a replaceable tubular bypass filter element 68. Replaceable filter element 68, which is operative to filter out relatively small contaminant particles (i.e., sub 40 micron size particles) from oil operatively traversing the oil filter assembly 10 as later described herein, is representatively of a wound fabric construction, but could alternatively be of other constructions, such as a foam filtration material, if desired. Together, the perforated flow tube 56, the bypass head member 62 and the replaceable bypass filter element 68 form a uniquely operative bypass filter section 70 of the overall oil filter assembly 10. Of course, in an alternate configuration thereof, the replaceable tubular bypass filter element 68 may instead be constructed as a disposable filter element.

In addition to the bypass filter section 70, the oil filter assembly 10 also includes a full flow filtration section which is representatively defined by a tubular, reuseable and cleanable full flow filter element 72 which, as later described herein, is traversed by all of the oil flowing through the filter assembly 10. Full flow filter element 72 is representatively of a wire mesh construction and is operative to filter out from the oil relatively large contaminant particles (i.e., particles of about 40 micron size and above). Of course, in an alternate configuration thereof, the full flow filter element 72 may instead be constructed as a disposable filter element.

As best illustrated in FIGS. 2 and 3, the full flow filter element 72 is coaxially and removably received within the canister 14 and coaxially and outwardly circumscribes the bypass filter section 70. The raised central portion 48 of the bottom screen fixture 46 is telescopingly and supportingly received in a lower end portion of the full flow filter element 72, and a bottom annular side portion of the top screen fixture 38, below its peripheral flange 44, is telescopingly and supportingly received in a top end portion of the full flow filter element 72. As best illustrated in FIG. 3, the installed full flow filter element 72 forms within the canister 14 an annular outer flow area 74 which circumscribes the axis of the canister 14 and is disposed between the vertical interior side surface of the canister 14 and the full flow filter element 72, and an annular inner flow area 76 which circumscribes the bypass filter section 70 and is disposed between the full flow filter element 72 and the bypass filter section 70. The upper end of the annular outer flow area 74 underlies the angled inlet openings 32, and the downwardly dished upper end of the bypass head member 62 underlies the central opening in the adapter ring 34.

As shown in FIGS. 2 and 3, the oil filter assembly 10 is installed on the engine block 12 by simply rotating the assembly 10 relative to the engine block 12 in a manner causing an externally threaded tubular oil filter stub portion 78 of the engine to thread into the adapter ring 34, and an O-ring seal 79, carried in an annular groove in the top peripheral side portion of the adapter head 26, to be sealingly compressed against the engine block 12 and thereby seal off an axially inset portion 80 of the top side of the adapter head 26 positioned above its annular flange 30 and communicating with unfiltered oil discharge ports (not shown) in the engine block 12.

The unique operation of the installed oil filter assembly 10 will now be described in conjunction with FIGS. 2 and 3. During operation of the engine with which the oil filter assembly 10 is associated, oil 82 discharged from the engine during operation thereof is forced downwardly through the angled adapter head member inlet openings 32 and into the annular outer flow area 74 and is caused to swirl therein about the full flow filter element 72. This swirling or "vortex" flow pattern imparted to the oil 82 within the flow area 74 causes, by centrifugal force, contaminant particulates in the oil to be forced outwardly toward the vertical interior surface of the canister 14 (while partially purified oil 82 is forced inwardly through the full flow filter element 72 into the inner annular flow area 76) thereby permitting these contaminant particulates to settle downwardly into the contaminant chamber 54 via the peripheral notches 52 in the bottom side flange 50.

As illustrated in FIG. 3, a major portion 82a of the oil 82 entering the inner annular flow area 76 through the full flow filter element 72 (representatively 90 percent or more of such oil) is forced into and upwardly through the angled bypass head member discharge openings 66. The oil portion 82a upwardly exiting these angled discharge openings 66, around the upper end of the central bypass head opening 60, is caused to swirl about the axis of the bypass head 62 in a swirling flow pattern which creates a low pressure area similar to a tornado vacuum. This swirling flow pattern imparted to the oil portion 82a creates a venturi effect within the inset top portion 64 of the bypass head 62 which, in turn, creates a lowered pressure region adjacent the top end of the central opening 60.

Such lowered pressure region in the inset portion 64 operates to draw the remaining oil portion 82b within the inner annular flow area 76 laterally through the bypass filter section 70 (thereby filtering out sub-40 micron size contaminant particulates from the oil portion 82b), into and upwardly through the interior of the perforated tube 56, and then into the inset area 64 where the oil portion 82b joins the swirling oil portion 82a and is carried along therewith for discharge from the oil filter assembly and return to the engine via the oil filter stub 78.

As can be readily seen, the oil filter assembly 10 functions, in a single compact package, as both a full flow filter and a bypass filter, with the bypass filter portion of the overall assembly being representatively nested within its full flow filtration portion. There are no tubes required for the filtration system installation, only one external filtration device needs to be installed on the engine, and the separate full flow and bypass filtration sections are firmly supported within the canister 14 against possible vibration damage and resulting leakage. Representatively, the full flow and bypass filtration sections are arranged in series, with the oil 82 flowing first through the full flow filtration portion 72, and then flowing through the bypass filtration section 70.

By virtue of the incorporation of both full flow and bypass filtration sections in the oil filter assembly 10, the filter assembly 10 is provided with a substantially lengthened duty cycle since it is able to filter out from the oil circulated therethrough both 40+ micron sized contaminant particulates and sub-40 micron sized contaminant particulates. The compact and quite simple oil filter assembly 10 desirably provides the added benefit of fine particle bypass filtration without most of the disadvantages of conventional separate bypass filtration systems.

Referring now to FIGS. 3 and 4, after a duty cycle of the filter assembly 10 comes to an end, the assembly 10 may be easily and quickly readied for another duty cycle as follows. With the engine turned off, the drain plug 24 is removed, and the oil in the canister 14 drained therefrom. The canister 14 is then unscrewed and removed from the adapter head member 26 to expose the full and bypass filtration sections 72,70. The full flow filter element 72 is then removed from the canister 14, the upper end of the perforated tube 56 is removed from the bypass head 62, the bypass filter element 68 is upwardly removed from the tube 56 and discarded, and the reuseable filter element 72 is appropriately cleaned. A replacement bypass filter element 68 is installed on the tube 56, the tube 56 is reconnected to the bypass head 62, and the cleaned full flow filter element 72 is placed back in the canister. The canister 14 is then screwed back onto the adapter head member 26 as shown in FIGS. 2 and 3 to ready the oil filter assembly 10 for another duty cycle.

The foregoing detailed description is to be clearly understood as being given by way of illustration and example only, the spirit and scope of the present invention being limited solely by the appended claims.

What is claimed is:

1. Fluid filtration apparatus comprising:
   a housing structure having an internal flow path through which a fluid to be filtered maybe flowed;
   a full flow filtration structure operably interposed in said internal flow path, said full flow filtration structure filtering a major portion of the fluid;
   a bypass filtration structure interposed in said internal flow path, said bypass filtration structure filtering a minor portion of the fluid; and
   wherein said bypass filtration structure includes:
      a bypass portion through which a first portion of fluid traversing said internal flow passage may pass without appreciable filtration by said bypass portion of the first portion of fluid, and
      a filtering portion communicating with said bypass portion and through which a second portion of the fluid traversing said internal flow passage may pass, be filtered, and flow into said bypass portion for discharge therefrom,
      said bypass portion being operative to create a lowered pressure area serving to draw the second fluid portion through said filtering portion, wherein said bypass portion is operative to impart to fluid discharged therefrom a swirling flow pattern.

2. The fluid filtration apparatus of claim 1 wherein:
   said full flow filtration structures are disposed in series within said internal flow path.

3. The fluid filtration apparatus of claim 2 wherein:
   said full flow filtration structure is disposed upstream of said bypass filtration structure within said internal flow path.

4. The fluid filtration apparatus of claim 1 wherein:
   said bypass filtration structure is disposed within said full flow filtration structure.

5. The fluid filtration apparatus of claim 4 wherein:
   said full flow and bypass filtration structures have generally tubular configurations, with said bypass filtration structure being coaxially nested within said full flow filtration structure.

6. The fluid filtration apparatus of claim 1 further comprising:
   an adapter structure forming a portion of said housing structure and being operative to impart structure a swirling flow pattern centered about said full flow filtration structure.

7. The fluid filtration apparatus of claim 1 wherein:
   said bypass filtration structure is capable of filtering substantially finer particles than said full flow filtration structure.

8. The fluid filtration apparatus of claim 1 wherein:
   said fluid filtration apparatus is an oil filter assembly.

9. The fluid filtration apparatus of claim 1 wherein:
   said fluid to be filtered is a liquid.

10. The fluid filtration apparatus of claim 1 wherein:
    said fluid to be filtered is a gas.

11. Fluid filtration apparatus comprising:

a flow tube having side wall perforations and first and second longitudinal portions;

a tubular bypass member having opposite external surface portions between which an opening extends, said opening being configured to telescopingly receive said first longitudinal portion of said flow tube, said tubular bypass member having a central axis; and a tubular bypass filter element coaxially telescopable onto said second longitudinal portion of said flow tube, said bypass member having formed therein a spaced series of angled discharge openings through which fluid may be discharged, said angled discharge openings being axially and circumferentially shaped relative to the central axis of the tubular bypass member, said discharge openings being operative to utilize fluid exiting therefrom to create a lowered pressure area adjacent the received first longitudinal flow tube portion to thereby facilitate the entrance of a pressurized filterable fluid into said second longitudinal portion of said flow tube via said bypass filter element when said bypass filter element is telescoped onto said second longitudinal portion of said flow tube.

12. The fluid filtration apparatus of claim 11, wherein:

said second longitudinal portion of said flow tube has an outer end secured to and blocked by a fixture member.

13. The fluid filtration apparatus of claim 12 wherein:

said fixture member has a generally circular configuration, said outer end of said second longitudinal portion of said flow tube is secured to a central portion of said fixture member, and said fixture member has a periphery wit a circumferentially spaced series of notches formed therein.

14. The fluid filtration apparatus of claim 12 wherein:

said fixture member has a generally circular configuration with a peripheral annular flange having a circumferentially spaced series of peripheral notches thereon, and a raised central portion.

15. The fluid filtration apparatus of claim 11 wherein:

said discharge openings are oriented and configured to impart to fluid exiting said discharge openings a swirling flow pattern.

16. The fluid filtration apparatus of claim 11 wherein:

said discharge openings oriented and configured to impart to fluid exiting said discharge openings a swirling flow pattern which creates a tow pressure area.

17. The fluid filtration apparatus of claim 11 wherein:

said bypass filter element is an oil filter element.

18. The fluid filtration device of claim 11 wherein:

said fluid is a liquid.

19. The fluid filtration device of claim 11 wherein:

said fluid is a gas.

20. Fluid filtration apparatus comprising:

a generally tabular housing structure having a fluid inlet area and a fluid outlet area;

a generally tabular full flow fluid filter element coaxially and removably supported within said housing structure and defining with an interior surface portion thereof an annular outer flow area communicated with said fluid inlet area; and a generally cylindrical bypass fluid filtration structure coaxially supported within said fall flow fluid filter element and defining therewith an inner annular flow area, said bypass fluid filtration structure having an outlet portion communicated with said fluid outlet area of said housing structure, said fluid filtration apparatus being operative in response to a forced flow of a pressurized fluid to be filtered inwardly through said fluid inlet area of said housing structure to flow the fluid sequentially through said annular outer flow area, through said full flow filter element, through said inner annular flow area, through said bypass fluid filtration structure, outwardly through said outlet portion of said bypass fluid filtration structure, and outwardly through said fluid outlet area of said housing structure, wherein said bypass fluid filtration structure includes:

a generally tubular bypass portion in which said outlet portion is formed, and a generally tubular filtering portion communicating with said outlet portion, said outlet portion, in response to forced fluid flow therethrough, being operative to create a lowered pressure area serving to draw fluid through said filtering portion and into said bypass portion for discharge therefrom through said fluid outlet area of said housing structure, wherein said outlet portion is operative to impart to fluid being discharged therefrom a swirling flow pattern, wherein said generally tubular bypass portion has a side wall surface portion and an outlet end surface, and said outlet portion includes a circumferentially spaced series of discharge passages extending inwardly through said side wall surface portion, opening outwardly through said outlet end surface, and being axially and circumferentially angled relative to the axis of said bypass portion.

21. The fluid filtration apparatus of claim 20 wherein:

said fluid filtration apparatus is an oil filter assembly.

22. The fluid filtration apparatus of claim 20 wherein:

said fluid inlet area of said housing structure is configured in a manner such that pressurized fluid forced inwardly therethrough traverses said outer annular flow area in a whirling flow pattern centered about said full flow fluid filter element.

23. The fluid filtration apparatus of claim 20 wherein said generally tubular filtering portion includes:

a perforated flow tube member having a first longitudinal portion removably and coaxially received in said bypass portion, and a second longitudinal portion, and a tubular bypass fluid filter element removably and coaxially telescoped onto said second longitudinal portion of said perforated flow tube.

24. The fluid filtration apparatus of claim 20 wherein:

said tubular bypass fluid filter element is a disposable filter element.

25. The fluid filtration apparatus of claim 20 wherein:

said tubular bypass fluid filter element is a cleanable and reusable filter element.

26. The fluid filtration apparatus of claim 20 wherein:

said full flow fluid filter element is a cleanable and reusable filter element.

27. The fluid filtration apparatus of claim 20 wherein:

said full flow fluid filtration element is a disposable filter element.

28. The fluid filtration apparatus of claim 20 wherein:

said pressurized fluid is a liquid.

29. The fluid filtration apparatus of claim 20 wherein:

said pressurized fluid is a gas.

* * * * *